US012631068B2

(12) United States Patent     (10) Patent No.:    US 12,631,068 B2

Dings                    (45) Date of Patent:    \*May 19, 2026

(54) LADDER FOOT AND LADDER THEREWITH

(71) Applicant: Werner Co., Itasca, IL (US)

(72) Inventor: Steve Dings, Mentor, OH (US)

(73) Assignee: Werner Co., Itasca, IL (US)

( * ) Notice:    Subject to any disclaimer, the term of this patent is extended or adjusted under 35 U.S.C. 154(b) by 1166 days.

This patent is subject to a terminal disclaimer.

(21) Appl. No.: 17/483,568

(22) Filed:    Sep. 23, 2021

(65)             Prior Publication Data

US 2022/0010621 A1     Jan. 13, 2022

Related U.S. Application Data

(63) Continuation of application No. 15/385,628, filed on Dec. 20, 2016, now Pat. No. 11,131,142.

(51) Int. Cl.
     *E06C 7/42*         (2006.01)
     *B29C 39/00*      (2006.01)
            (Continued)

(52) U.S. Cl.
     CPC .............. *E06C 7/42* (2013.01); *B29C 39/003* (2013.01); *B29C 39/10* (2013.01); *E06C 1/16* (2013.01);
            (Continued)

(58) Field of Classification Search
     CPC ................ E06C 7/42; E06C 7/46; E04G 5/02
     See application file for complete search history.

(56)           References Cited

U.S. PATENT DOCUMENTS

| 1,243,844 A | 10/1917 | Lofstrom |
| 1,293,066 A | 2/1919 | Faulkner |
| | (Continued) | |

FOREIGN PATENT DOCUMENTS

| GB | 2360548 | 9/2001 |
| IT | 20180000297 | 2/2018 |
| | (Continued) | |

OTHER PUBLICATIONS

US D973,231 S, 12/2022, Maxfield (withdrawn)

(Continued)

*Primary Examiner* — David E Martinez

(74) *Attorney, Agent, or Firm* — Fitch, Even, Tabin & Flannery LLP

(57)            ABSTRACT

A ladder having a first rail having a bottom and a web, a first flange attached to a first end of the web and a second flange attached to a second end of the web. The ladder having a second rail. The ladder having rungs attached to the first rail and second rail upon which a user steps to climb the ladder. The ladder having a foot having a plastic body with a recess which receives the end of the first rail and is positioned about and conforms to the web and the first and second flanges of the first rail. The foot has a plastic base having a top side from which the body extends. The base has an edge positioned about the body with perforations, and a rubber tread disposed along an underside of the base and extending through the perforations and along the edge on the top side of the base to form an overmolded portion of the tread that attaches the tread to the base without any mechanical or other types of fasteners. The rubber tread forms a bond with the underside of the base and the edge on the top side of the base. The foot for a bottom of a rail of a ladder. A method for placing a ladder. A method for producing a foot for a bottom of a rail of a ladder.

20 Claims, 7 Drawing Sheets

(51) Int. Cl.

| | | |
|---|---|---|
| *B29C 39/10* | (2006.01) |
| *E06C 1/16* | (2006.01) |
| *E06C 1/383* | (2006.01) |
| *E06C 1/387* | (2006.01) |
| *E06C 1/393* | (2006.01) |
| *B29K 27/06* | (2006.01) |
| *B29K 623/00* | (2006.01) |
| *B29L 31/00* | (2006.01) |

(52) U.S. Cl.

CPC .............. *E06C 1/383* (2013.01); *E06C 1/387* (2013.01); *E06C 1/393* (2013.01); *B29K 2027/06* (2013.01); *B29K 2623/12* (2013.01); *B29L 2031/745* (2013.01)

(56) References Cited

U.S. PATENT DOCUMENTS

| | | | | |
|---|---|---|---|---|
| 1,352,323 | A | 9/1920 | Stephan | |
| 1,382,833 | A * | 6/1921 | Hurd | E06C 7/46 |
| | | | | 182/108 |
| 1,431,068 | A | 10/1922 | Waney | |
| 1,436,804 | A | 11/1922 | Hubbard | |
| 1,459,350 | A | 6/1923 | Veniero | |
| 1,496,201 | A | 6/1924 | Baxter | |
| 1,543,723 | A | 6/1925 | Rivitz | |
| 1,558,479 | A | 10/1925 | Hearn | |
| 1,570,576 | A | 1/1926 | Rivitz | |
| 1,600,103 | A | 9/1926 | Evans | |
| 1,879,017 | A | 9/1932 | Babitt | |
| 1,973,226 | A | 9/1934 | Rose | |
| 2,163,970 | A | 6/1939 | White | |
| 2,277,939 | A | 3/1942 | Thalhammer | |
| 2,309,484 | A | 1/1943 | Van | |
| 2,407,575 | A | 9/1946 | Ramsey | |
| 2,503,626 | A | 4/1950 | Mayberry | |
| 2,567,989 | A | 9/1951 | Cheek | |
| 2,605,037 | A | 7/1952 | Smith | |
| 2,623,679 | A | 12/1952 | Agombar | |
| 2,691,479 | A | 10/1954 | Sharp | |
| 2,767,898 | A | 10/1956 | Cramer | |
| 3,005,513 | A | 10/1961 | Larson | |
| 3,099,103 | A | 7/1963 | Wright | |
| 3,805,917 | A | 4/1974 | Luther | |
| 3,913,942 | A | 10/1975 | Mackenzie | |
| 3,948,352 | A | 4/1976 | Larson | |
| 4,023,828 | A | 5/1977 | Mackenzie | |
| 4,304,318 | A | 12/1981 | Webb | |
| 4,415,062 | A | 11/1983 | Shaw | |
| 4,474,387 | A | 10/1984 | Maranell | |
| 4,546,996 | A | 10/1985 | Hanson | |
| 4,699,247 | A | 10/1987 | Clarke | |
| 4,748,734 | A | 6/1988 | Schmitt | |
| 5,054,812 | A | 10/1991 | Lagsdin | |
| 5,141,076 | A * | 8/1992 | Joyce | E06C 7/46 |
| | | | | 248/188.9 |
| 5,154,255 | A | 10/1992 | Kiska | |
| 5,370,203 | A | 12/1994 | Kiska | |
| D359,366 | S | 6/1995 | Spevak | |
| 5,427,342 | A | 6/1995 | Gagnon | |
| 5,522,473 | A | 6/1996 | Moselsky | |
| 5,547,220 | A | 8/1996 | Lagsdin | |
| 5,636,706 | A | 6/1997 | Plotner | |
| 5,645,272 | A | 7/1997 | Brennan, Sr. | |
| 5,791,435 | A | 8/1998 | Garnett | |
| 5,791,439 | A | 8/1998 | Plotner | |
| 5,908,085 | A | 6/1999 | Lovelady | |
| 5,918,698 | A | 7/1999 | Lunn | |
| 5,957,496 | A | 9/1999 | Lagsdin | |
| 6,012,546 | A | 1/2000 | Bee | |
| 6,044,929 | A | 4/2000 | Wishner | |
| 6,142,325 | A * | 11/2000 | Chomik | B65D 41/0442 |
| | | | | 215/370 |
| 6,227,570 | B1 | 5/2001 | Martinez | |
| 6,422,603 | B2 | 7/2002 | Lagsdin | |
| 6,499,563 | B1 | 12/2002 | Bremick | |
| 6,634,672 | B1 | 10/2003 | Lagsdin | |
| 7,000,731 | B2 | 2/2006 | Swiderski | |
| 7,028,808 | B2 | 4/2006 | Zeaman | |
| 7,207,534 | B2 | 4/2007 | Crain | |
| D555,258 | S * | 11/2007 | Wirch | D25/68 |
| 7,516,817 | B2 | 4/2009 | Pate | |
| 7,803,031 | B1 | 9/2010 | Winckler | |
| 7,837,010 | B2 * | 11/2010 | Astor | E06C 7/46 |
| | | | | 182/220 |
| D650,915 | S | 12/2011 | Gross | |
| 8,407,855 | B2 | 4/2013 | Gagnon | |
| D692,163 | S | 10/2013 | Goransson | |
| 8,807,277 | B1 | 8/2014 | Reyna Lerma | |
| 9,145,687 | B1 | 9/2015 | Bancroft | |
| 9,435,155 | B2 * | 9/2016 | Tiber | E06C 7/46 |
| D799,063 | S | 10/2017 | Yin | |
| 9,834,989 | B2 | 12/2017 | Lanzafame | |
| 10,017,989 | B1 | 7/2018 | Kellogg | |
| 10,138,682 | B2 | 11/2018 | Mora | |
| 10,206,511 | B2 | 2/2019 | Peters | |
| 10,612,302 | B2 | 4/2020 | Maxfield | |
| D895,846 | S | 9/2020 | Adair | |
| D899,628 | S | 10/2020 | Moncada | |
| 10,808,459 | B2 | 10/2020 | Cook | |
| 11,131,142 | B2 | 9/2021 | Dings | |
| D935,053 | S | 11/2021 | Lentine | |
| D935,054 | S | 11/2021 | Maxfield | |
| 11,346,154 | B2 | 5/2022 | Major | |
| 11,408,226 | B2 | 8/2022 | Maxfield | |
| 11,441,355 | B2 | 9/2022 | Lawson | |
| D966,557 | S | 10/2022 | Maxfield | |
| D970,753 | S * | 11/2022 | Collins | D25/68 |
| 11,536,087 | B2 | 12/2022 | Tiber | |
| D975,317 | S | 1/2023 | Hu | |
| D999,404 | S | 9/2023 | Maxfield | |
| 11,891,857 | B2 | 2/2024 | Zhu | |
| 11,933,106 | B2 | 3/2024 | Beggs | |
| 12,084,918 | B2 | 9/2024 | Mora | |
| 2003/0079942 | A1 | 5/2003 | Pettit | |
| 2004/0020715 | A1* | 2/2004 | Swiderski | E06C 7/46 |
| | | | | 182/108 |
| 2004/0178617 | A1 | 9/2004 | Lagsdin | |
| 2005/0011702 | A1* | 1/2005 | Zeaman | E06C 7/42 |
| | | | | 182/108 |
| 2006/0054391 | A1 | 3/2006 | Tilley | |
| 2006/0231334 | A1 | 10/2006 | Hall | |
| 2007/0221443 | A1* | 9/2007 | Nelson | E06C 7/081 |
| | | | | 182/108 |
| 2007/0227819 | A1 | 10/2007 | Layfield | |
| 2007/0246301 | A1 | 10/2007 | Shaffer | |
| 2008/0190697 | A1 | 8/2008 | Skurkis | |
| 2010/0116592 | A1* | 5/2010 | Clements | E06C 1/39 |
| | | | | 182/180.1 |
| 2011/0017549 | A1 | 1/2011 | Lietz | |
| 2011/0139544 | A1 | 6/2011 | Frick | |
| 2012/0175188 | A1 | 7/2012 | Xu | |
| 2012/0261214 | A1 | 10/2012 | Dondurur | |
| 2014/0001333 | A1 | 1/2014 | Stephen | |
| 2014/0238777 | A1* | 8/2014 | Adair | E06C 7/46 |
| | | | | 182/108 |
| 2014/0332316 | A1 | 11/2014 | Tiber | |
| 2014/0353084 | A1 | 12/2014 | Lafontaine | |
| 2015/0159435 | A1* | 6/2015 | Vela | E06C 7/46 |
| | | | | 182/129 |
| 2017/0370520 | A1 | 12/2017 | Knickrehm | |
| 2018/0094403 | A1 | 4/2018 | Nobles | |
| 2018/0171714 | A1 | 6/2018 | Dings | |
| 2018/0179821 | A1 | 6/2018 | Mora | |
| 2018/0230746 | A1 | 8/2018 | Maxfield | |
| 2019/0078386 | A1 | 3/2019 | Mora | |
| 2019/0226279 | A1 | 7/2019 | Beggs | |
| 2020/0232278 | A1 | 7/2020 | Maxfield | |
| 2020/0240210 | A1 | 7/2020 | Maxfield | |
| 2020/0325727 | A1 | 10/2020 | Reyes Acosta | |
| 2022/0018189 | A1 | 1/2022 | Coulter | |
| 2022/0316276 | A1 | 10/2022 | Maxfield | |
| 2023/0122566 | A1 | 4/2023 | Heinrichs | |
| 2024/0191575 | A1 | 6/2024 | Beggs | |

(56)　　　　　References Cited

U.S. PATENT DOCUMENTS

FOREIGN PATENT DOCUMENTS

MX　　　2019012208　　1/2020
WO　　　202371975　　　5/2023

OTHER PUBLICATIONS

USPTO; U.S. Appl. No. 16/191,121; Non-Final Rejection mailed Aug. 25, 2023; (pp. 1-16).
USPTO; U.S. Appl. No. 15/878,089; Final Rejection mailed Sep. 18, 2023; (pp. 1-9).
USPTO; U.S. Appl. No. 15/878,089; Notice of Allowance and Fees Due (PTOL-85) mailed Dec. 12, 2023; (pp. 1-7).
Gorilla Ladders 300 lb. capacity 2.5 FT Stool Size Brochure/Specification Sheet—depicting a product that was publicly available on or before Jun. 6, 2024, 1 page.
Littlegiantladders.com, Web page for Little Giant Mightylite 2.0 Fiberglass Stepladder—depicting a product that was publicly available on or before Jun. 6, 2024, 26 pages. https://www.littlegiantladders.com/products/mightylite-2-0.
Louisville Ladder Fiberglass Step Ladder Series FS1500 Brochure/Specification Sheet—depicting a product that was publicly available on or before Jun. 6, 2024, 2 pages.
Werner Co., MT Series Lightweight Multi-Position Ladder Brochure/Specification Sheet—depicting a product that was publicly available on or before Jun. 6, 2024, 2 pages.
Werner.com, Web page for FS100 Series Step Ladders | Werner US—depicting a product that was publicly available on or before Jun. 6, 2024, 3 pages. https://www.wernerco.com/us/products/ladders/step-ladders/FS100Series.
Werner.com, Web page for FS204 Step Ladders | Werner US—depicting a product that was publicly available on or before Jun. 6, 2024, 11 pages. https://www.wernerco.com/us/products/ladders/step-ladders/FS200Series/FS204.
Yosoo, Ladder Feet Covers—depicting a product that was publicly available on or before Jul. 8, 2024, 7 pages. https://www.amazon.ca/Replacement-Rubber-Ladder-Cover-Cushion/dp/B01N0OVD1F.
1996 Werner Catalog—Available on or before Dec. 31, 1996, 2 pages.
1999 Louisville Ladder Catalog—Available on or before May 18, 1999, 11 pages.
1999 Louisville Ladder Rhino 375 Press Release—Available on or before Aug. 29, 1999, 1 page.

2000 Werner T7200 Brochure—Available on or before Apr. 30, 2000, 1 page.
2001 Louisville Ladder Catalog—Available on or before Jun. 30, 2001, 5 pages.
2001 Louisville Ladder Website Catalog—Available on or before Jan. 17, 2001, 1 page.
Collection of web pages for various Louisville Ladders—Available on or before Jan. 21, 2020, 33 pages.
Copyright registration of Modern Plastics Handbook, Mar. 13, 2000, 1 page.
Declaration of Jon B. Ver Halen submitted in IPR 2019-00336—Available on or before Mar. 22, 2019, 112 pages.
Declaration of Mack A. Quan submitted in IPR 2019-00336—Available on or before Nov. 22, 2019, 40 pages.
Declaration of Thomas J. Schmitt submitted in IPR 2019-00336—Available on or before Nov. 22, 2019, 41 pages.
Excerpts from McGraw-Hill Dictionary of Scientific and Technical Terms, Sixth Edition, McGraw-Hill Available on or before Dec. 31, 2003, 5 pages.
FM1100HD Series ladder website—available on or before Aug. 28, 1999, 1 page.
FP1100HD Series step ladder website—Available on or before Aug. 28, 1999, 1 page.
FS1000 Series Ladder website—Available on or before Jan. 17, 2001, 1 page.
Huntsman Website Excerpts—Available on or before Jul. 10, 2001, submitted in IPR 2019-00336 with Affidavit of Christopher Butler, 6 pages.
IPR Petition submitted in IPR 2019-00336—U.S. Pat. No. 7,000,731 Patent—on Mar. 22, 2019, 73 pages.
Louisville Ladder Accessories website—Available on or before Feb. 17, 2001, 1 page.
Harper, Charles A., Modern Plastics Handbook—Available on or before Mar. 13, 2000, 268 pages.
Patent Owner Demonstrative Exhibits submitted in IPR 2019-00336—Available on or before May 28, 2020, 48 pages.
Petitioners Demonstrative Exhibits submitted in IPR 2019-00336—Available on or before May 28, 2020, 104 pages.
Rhino 375 Fiberglass Mechanic Step Ladder website—Available on or before Jan. 17, 2001, 1 page.
Rhino 375 Website registration—Available on or before Apr. 19, 2001, 1 page.
Web page for Louisville Ladder Series FM1500 3-Foot Fiberglass Ladder—Available on or before Jan. 21, 2020, 3 pages.
Web page for Louisville Ladder Series FS1500 3-Foot Fiberglass Ladder—Available on or before Jan. 21, 2020, 4 pages.

* cited by examiner

24

20

14

22

18

12

LADDER
RAIL

RIVETS

68

OVERMOLDED
FOOT

26

LADDER FOOT AND LADDER THEREWITH

CROSS-REFERENCE TO RELATED APPLICATIONS

This is a divisional of U.S. patent application Ser. No. 15/385,628 filed Dec. 20, 2016, now U.S. Pat. No. 11,131, 142, incorporated by reference herein.

FIELD OF THE INVENTION

The present invention is related to a ladder having an overmolded foot at the bottom of each rail of the ladder. (As used herein, references to the "present invention" or "invention" relate to exemplary embodiments and not necessarily to every embodiment encompassed by the appended claims.) More specifically, the present invention is related to a ladder having overmolded foot at the bottom of each rail of the ladder where the overmolded foot has a rubber tread that bonds with a plastic body and is positioned about an edge of a top side of a base from which the plastic body extends.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Whenever a ladder is used, one concern is a stable and secure support of the ladder against the floor or ground. A foot placed on the bottom of each rail of the ladder is used to better achieve the desired stable and secure support of the ladder against the floor or ground. The foot has a surface there better adapts and conforms to the floor or ground than the bottom of a rail itself. The foot attaches to the bottom of the rail and acts as an extension of the bottom of the rail to interact with the floor or ground. To achieve a better interaction of the ladder rail with the floor or ground, the material that actually contacts the floor ground of the foot has a moldable or adaptable characteristic and grips the floor or ground and provides a greater surface area with the floor ground than the material that attaches to the bottom of the rail, which generally is firmer and stronger structurally to form a better attachment with the rail. By using mechanical fasteners or other additional components than the material that interfaces with the floor or ground, and the different material that engages with the bottom of the rail, there are more components that could break, resulting in the foot being unusable.

BRIEF SUMMARY OF THE INVENTION

The present invention pertains to a ladder. The ladder comprises a first rail having a bottom and a web, a first flange attached to a first end of the web and a second flange attached to a second end of the web. The ladder comprises a second rail. The ladder comprises rungs attached to the first rail and second rail upon which a user steps to climb the ladder. The ladder comprises a foot having a plastic body with a recess which receives the end of the first rail and is positioned about and conforms to the web and the first and second flanges of the first rail. The foot has a plastic base having a top side from which the body extends. The base has an edge positioned about the body with perforations, and a rubber tread disposed along an underside of the base and extending through the perforations and along the edge on the top side of the base to form an overmolded portion of the tread that attaches the tread to the base without any mechanical or other types of fasteners. The rubber tread forms a bond with the underside of the base and the edge on the top side of the base.

The present invention pertains to a foot for a bottom of a rail of a ladder. The foot comprises a plastic body with a recess which receives the end of the first rail and is positioned about and conforms to a web and first and second flanges of the first rail. The foot comprises a plastic base having a top side from which the body, the base has an edge positioned about the body with perforations. The foot comprises a rubber tread disposed along an underside of the base and extending through the perforations and along the edge on the top side of the base to form an overmolded portion of the tread that attaches the tread to the base without any mechanical or other types of fasteners. The rubber tread forms a bond with the underside of the base and the edge on the top side of the base.

The present invention pertains to a method for placing a ladder. The method comprises the steps of carrying the ladder to a desired location. The ladder comprises a first rail having a bottom and a web, a first flange attached to a first end of the web and a second flange attached to a second end of the web. The ladder comprises a second rail. The ladder comprises rungs attached to the first rail and second rail upon which a user steps to climb the ladder. The ladder comprises a foot having a plastic body with a recess which receives the end of the first rail and is positioned about and conforms to the web and the first and second flanges of the first rail. The foot has a plastic base having a top side from which the body extends. The base has an edge positioned about the body with perforations, and a rubber tread disposed along an underside of the base and extending through the perforations and along the edge on the top side of the base to form an overmolded portion of the tread that attaches the tread to the base without any mechanical or other types of fasteners. The rubber tread forms a bond with the underside of the base and the edge on the top side of the base. There is the step of standing the ladder on the foot so the tread contacts a floor or ground.

The present invention pertains to a method for forming a foot for a bottom of a ladder rail. The method comprises the steps of placing a plastic body and a plastic base attached to the body in a mold. The plastic body having a recess which receives the end of the first rail and is positioned about and conforms to a web and first and second flanges of the first rail. The plastic base having a top side from which the body extends. The base having an edge positioned about the body with perforations. There is the step of pouring rubber into the mold to form a rubber tread disposed along an underside of the base and extending through the perforations and along the edge on the top side of the base to form an overmolded portion of the tread that attaches the tread to the base without any mechanical or other types of fasteners, the rubber tread forming a bond with the underside of the base and the edge on the top side of the base.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
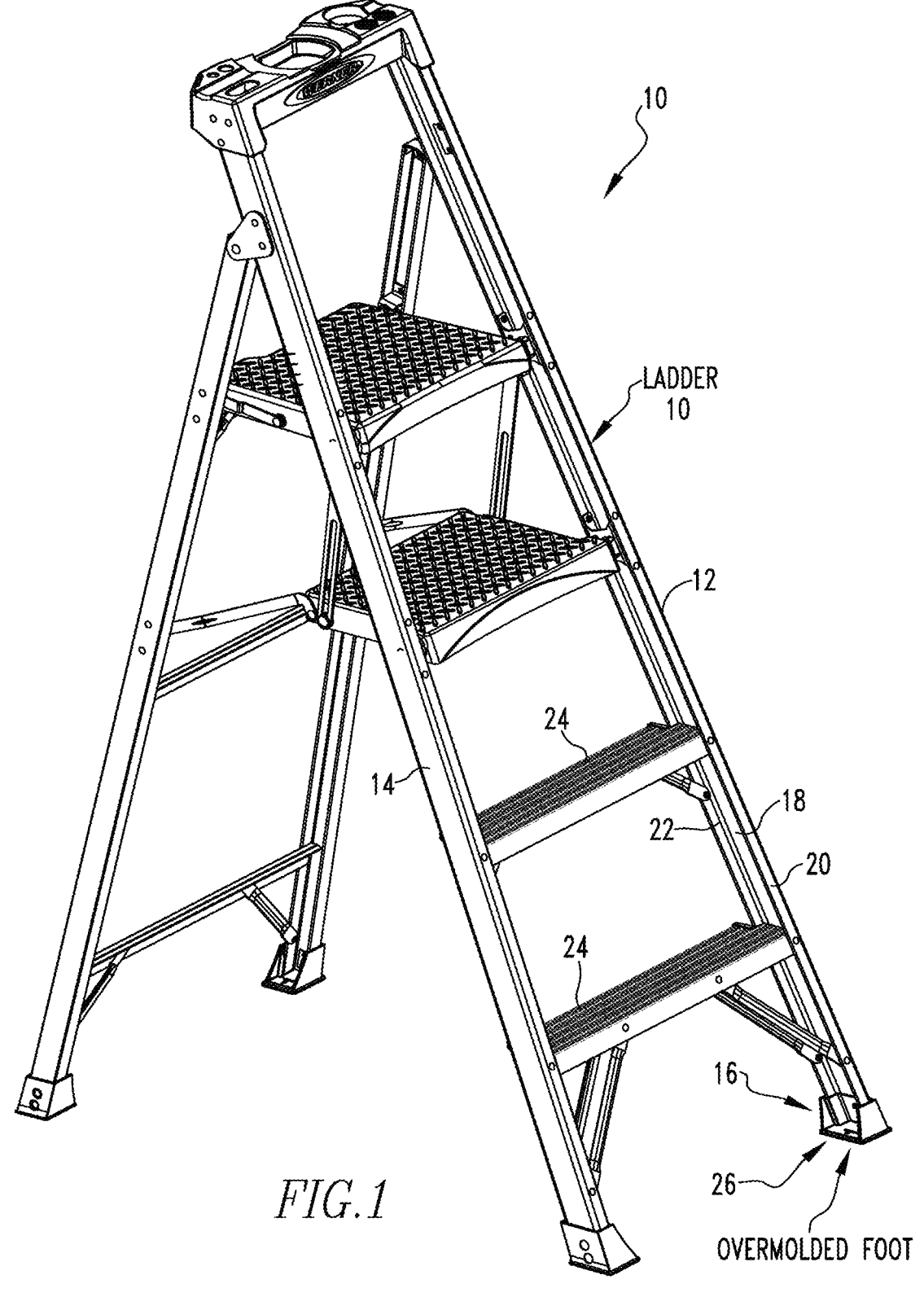
FIG. 1 shows an overall view of a ladder which has overmolded feet.

Referring now to the drawings wherein like reference numerals refer to similar or identical parts throughout the several views, and more specifically to FIGS. 1-4 thereof, there is shown a ladder 10. The ladder 10 comprises a first rail 12 having a bottom 16 and a web 18, a first flange 20 attached to a first end of the web 18 and a second flange 22 attached to a second end of the web 18. The ladder 10 comprises a second rail 14. The ladder 10 comprises rungs 24 attached to the first rail 12 and second rail 14 upon which a user steps to climb the ladder 10. The ladder 10 comprises a foot 26 having a plastic body 28 with a recess 30 which receives the end of the first rail 12 and is positioned about and conforms to the web 18 and the first and second flanges 20, 22 of the first rail 12. The foot 26 has a plastic base 32 having a top side 34 from which the body 28 extends, as shown in FIGS. 4-8. The base 32 has an edge 36 positioned about the body 28 with perforations 38, and a rubber tread 40 disposed along an underside 42 of the base 32 and extending through the perforations 38 and along the edge 36 on the top side 34 of the base 32 to form an overmolded portion 44 of the tread 40 that attaches the tread 40 to the base 32 without any mechanical or other types of fasteners, as shown in FIG. 9. The rubber tread 40 forms a bond with the underside 42 of the base 32 and the edge 36 on the top side 34 of the base 32.

The overmolded portion 44 of the tread 40 may extend to the body 28. The body 28 may have a perimeter 46 along the edge 36 on the top side 34 of the base 32 that abuts the over portion of the tread 40 on the top side 34 of the base 32. The perimeter 46 may be a first wall 48, a second wall 50 directly connected to the first wall 48, a third wall 52 directly connected to the second wall 50 and a fourth wall 54 directly connected to the third wall 52, as shown in FIGS. 5-9.

The recess 30 may be defined by a fifth wall 56 that directly connects to and extends essentially perpendicular from the second wall 50, a sixth wall 58 that directly connects to and extends essentially perpendicular from the fifth wall 56 and in parallel and in spaced relation with the second wall 50, a seventh wall 60 that directly connects to and extends essentially perpendicular from the sixth wall 58 and in parallel with and in spaced relation with the third wall 52, an eighth wall 62 that directly connects to and extends essentially perpendicular from the seventh wall 60 and in parallel and spaced relation with the third wall 52, and a ninth wall 64 that directly connects to and extends essentially perpendicularly from the eighth wall 62 to the fourth wall 54 and directly connects to the fourth wall 54. The first wall 48 may directly extend less than an inch from the base 32, and the second through ninth walls 50, 52, 54, 56, 58, 60, 62, 65 may extend more than 2 inches from the base 32.

The first wall 48 may be in spaced relation with and at least 1 inch apart from the fifth and ninth walls 56, 64, and the seventh wall 60 is in spaced relation and at least about 2 inches apart from the first wall 48. The body 28 may have an open area 66 between the first wall 48 and the fifth through ninth walls 56, 64. The body 28 and base 32 may be one piece. The underside 42 of the base 32 may be flat. The third wall 52 and the seventh wall 60 may have rivet holes 21 in which rivets 68 extend through and into the first rail 12 to attach the foot 26 to the rail.

The present invention pertains to a foot 26 for a bottom 16 of a rail of a ladder 10, as shown in FIGS. 5-9. The foot 26 comprises a plastic body 28 with a recess 30 which receives the end of the first rail 12 and is positioned about and conforms to a web 18 and first and second flanges 20, 22 of the first rail 12. The foot 26 comprises a plastic base 32 having a top side 34 from which the body 28, the base 32 has an edge 36 positioned about the body 28 with perforations 38. The foot 26 comprises a rubber tread 40 disposed along an underside 42 of the base 32 and extending through the perforations 38 and along the edge 36 on the top side 34 of the base 32 to form an overmolded portion 44 of the tread 40 that attaches the tread 40 to the base 32 without any mechanical or other types of fasteners. The rubber tread 40 forms a bond with the underside 42 of the base 32 and the edge 36 on the top side 34 of the base 32.

The present invention pertains to a method for placing a ladder 10. The method comprises the steps of carrying the ladder 10 to a desired location. The ladder 10 comprises a first rail 12 having a bottom 16 and a web 18, a first flange 20 attached to a first end of the web 18 and a second flange 22 attached to a second end of the web 18. The ladder 10 comprises a second rail 14. The ladder 10 comprises rungs 24 attached to the first rail 12 and second rail 14 upon which a user steps to climb the ladder 10. The ladder 10 comprises a foot 26 having a plastic body 28 with a recess 30 which receives the end of the first rail 12 and is positioned about and conforms to the web 18 and the first and second flanges 20, 22 of the first rail 12. The foot 26 has a plastic base 32 having a top side 34 from which the body 28 extends. The base 32 has an edge 36 positioned about the body 28 with perforations 38, and a rubber tread 40 disposed along an underside 42 of the base 32 and extending through the perforations 38 and along the edge 36 on the top side 34 of the base 32 to form an overmolded portion 44 of the tread 40 that attaches the tread 40 to the base 32 without any mechanical or other types of fasteners. The rubber tread 40 forms a bond with the underside 42 of the base 32 and the edge 36 on the top side 34 of the base 32. There is the step of standing the ladder 10 on the foot 26 so the tread 40 contacts a floor or ground.

The present invention pertains to a method for forming a foot 26 for a bottom 16 of a ladder 10 rail. The method comprises the steps of placing a plastic body 28 and a plastic base 32 attached to the body 28 in a mold. The plastic body 28 having a recess 30 which receives the end of the first rail 12 and is positioned about and conforms to a web 18 and first and second flanges 20, 22 of the first rail 12. The plastic base 32 having a top side 34 from which the body 28 extends. The base 32 having an edge 36 positioned about the body 28 with perforations 38. There is the step of pouring rubber into the mold to form a rubber tread 40 disposed along an underside 42 of the base 32 and extending through the perforations 38 and along the edge 36 on the top side 34 of the base 32 to form an overmolded portion 44 of the tread 40 that attaches the tread 40 to the base 32 without any mechanical or other types of fasteners, the rubber tread 40 forming a bond with the underside 42 of the base 32 and the edge 36 on the top side 34 of the base 32.

FIG. 1 shows an overall view of a ladder 10 which has overmolded feet.

Figure 2:
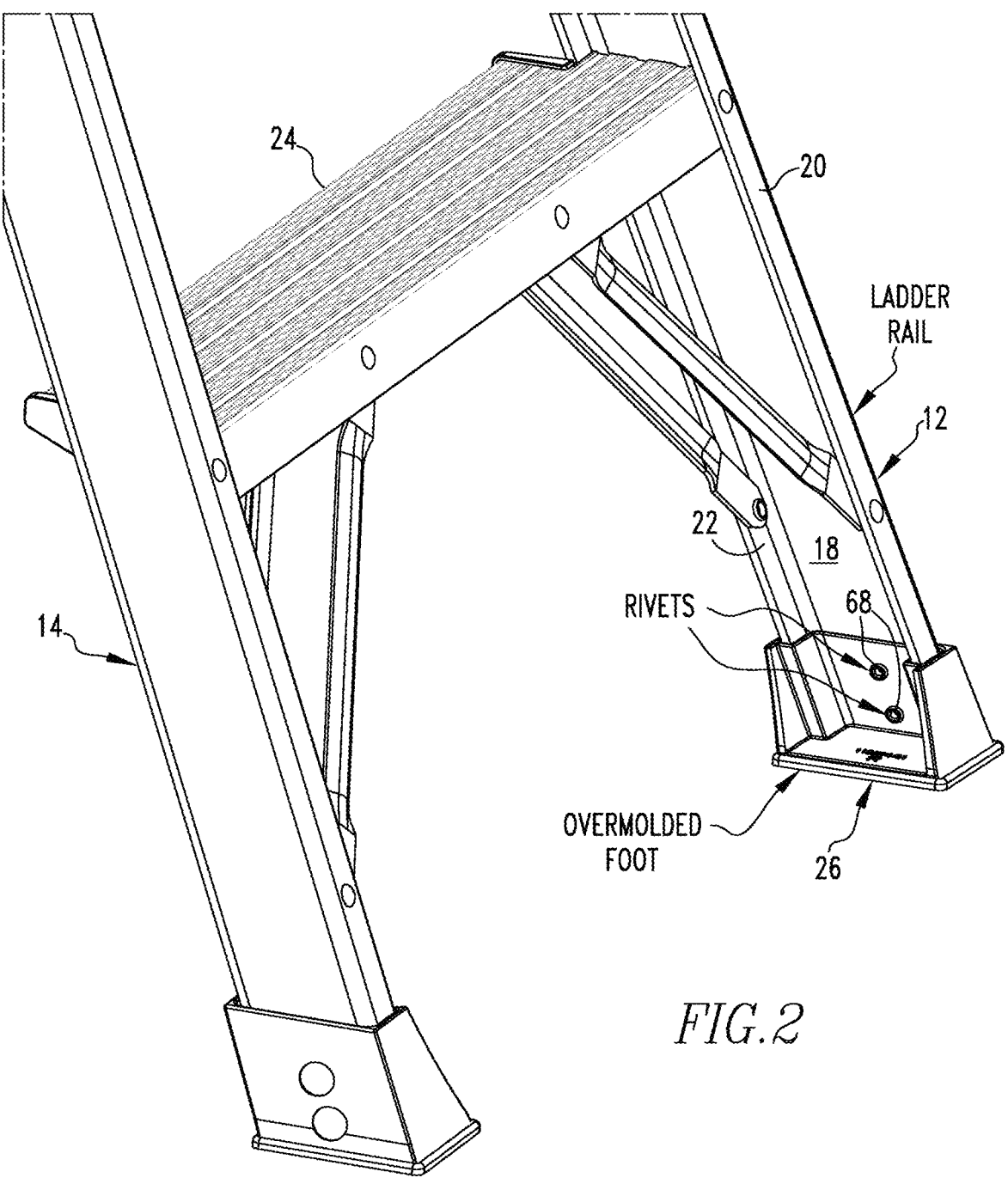
FIG. 2 shows a closer view of one of the overmolded feet attached to the bottom of one of the ladder rails by means of two rivets 68.

FIG. 2 shows a closer view of one of the overmolded feet attached to the bottom 16 of one of the ladder 10 rails by means of two rivets 68.

Figure 3:
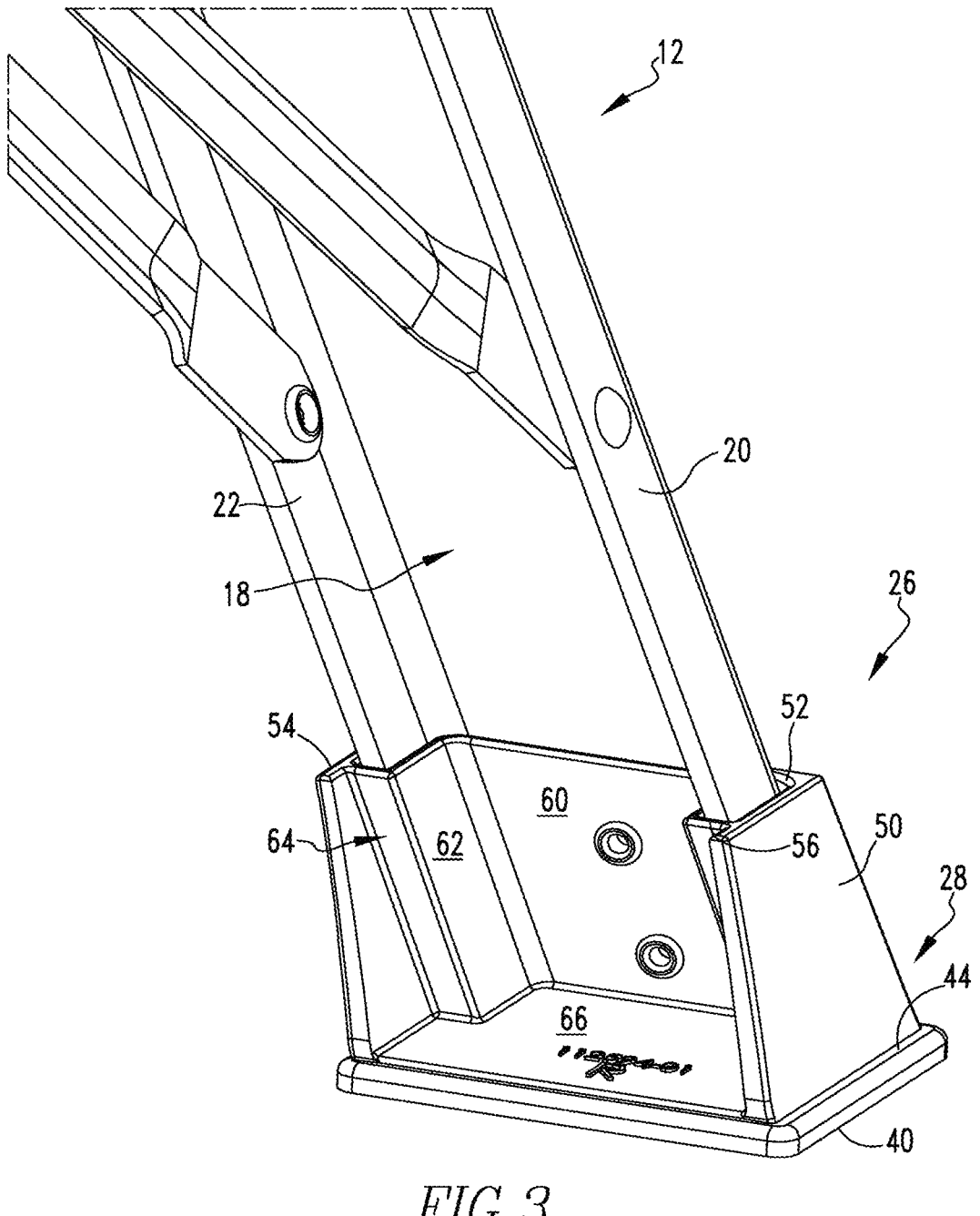
FIG. 3 is a closer view of the overmolded foot attached to the first rail.

FIG. 3 is a closer view of the overmolded foot 26 attached to the first rail 12.

Figure 4:
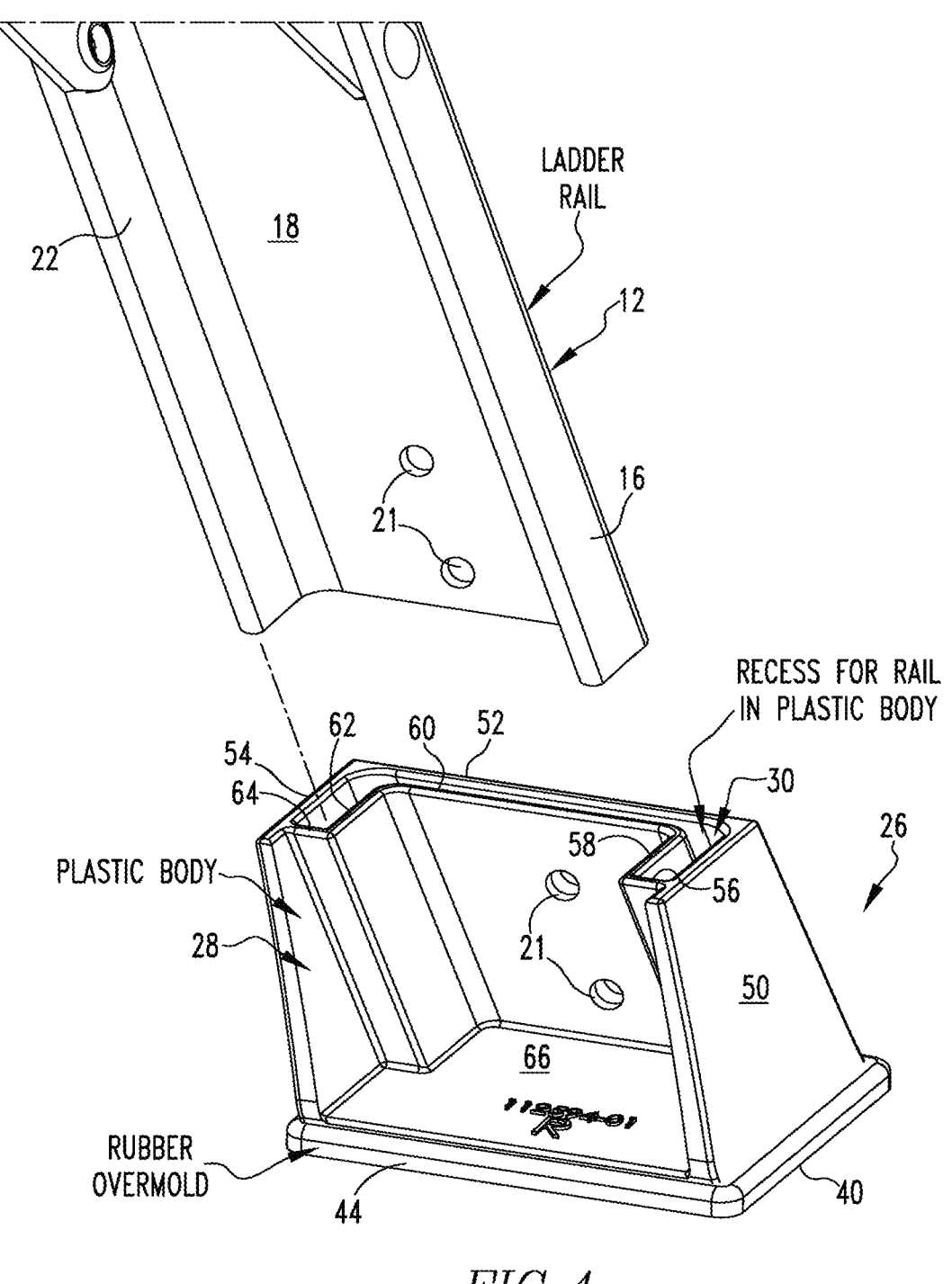
FIG. 4 shows the overmolded foot prior to being attached to the ladder rail.

FIG. 4 shows the overmolded foot 26 prior to being attached to the ladder 10 rail. Notice that the overmolded foot 26 is made of a plastic body 28 with a rubber portion overmolded onto its top side 34 of the base 32. Notice also that the plastic body 28 is made with a recess 30 closely matching the contours of the rail profile, into which the rail is inserted at assembly immediately prior to riveting. The ladder 10 rail is surrounded on all sides.

Figure 5:
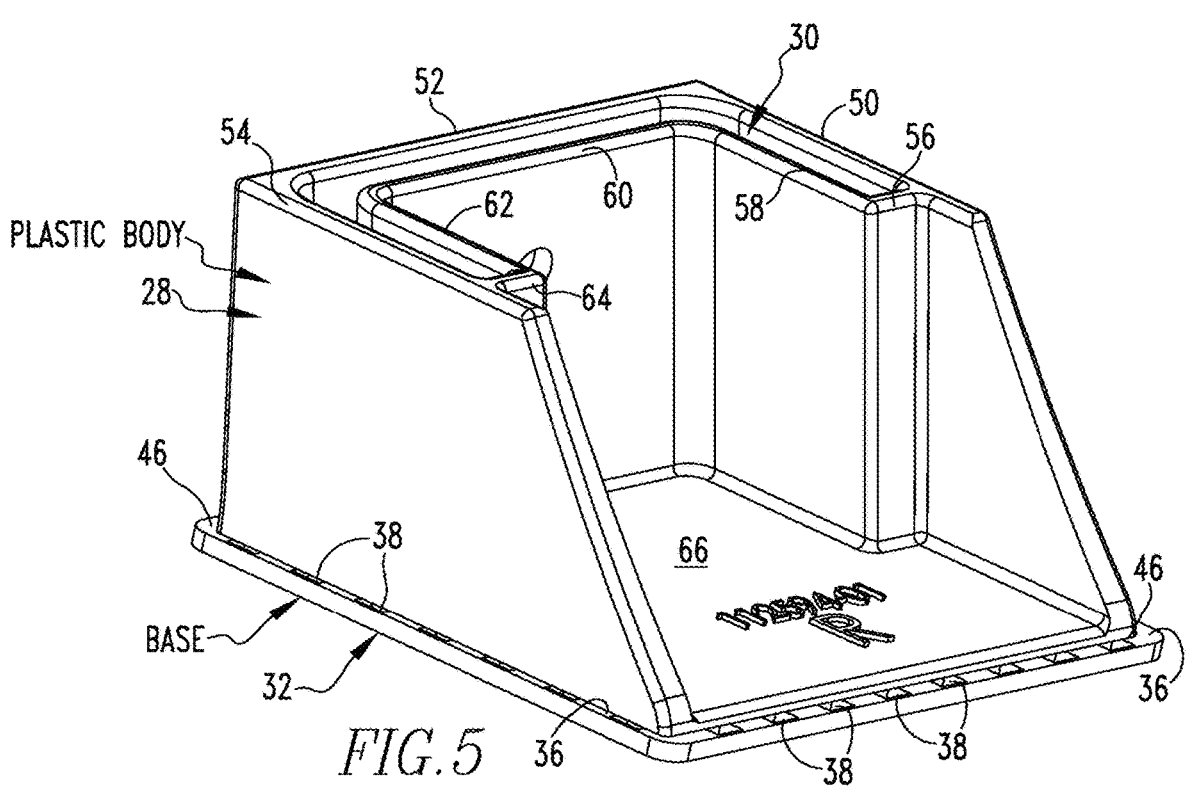
FIG. 5 shows a perspective view of only the plastic body portion of the foot.

FIG. 5 shows a perspective view of only the plastic body 28 portion of the foot 26. The plastic body 28 is made by a conventional molding process. This is how the foot 26 would appear prior to the secondary rubber overmolding operation.

Figure 6:
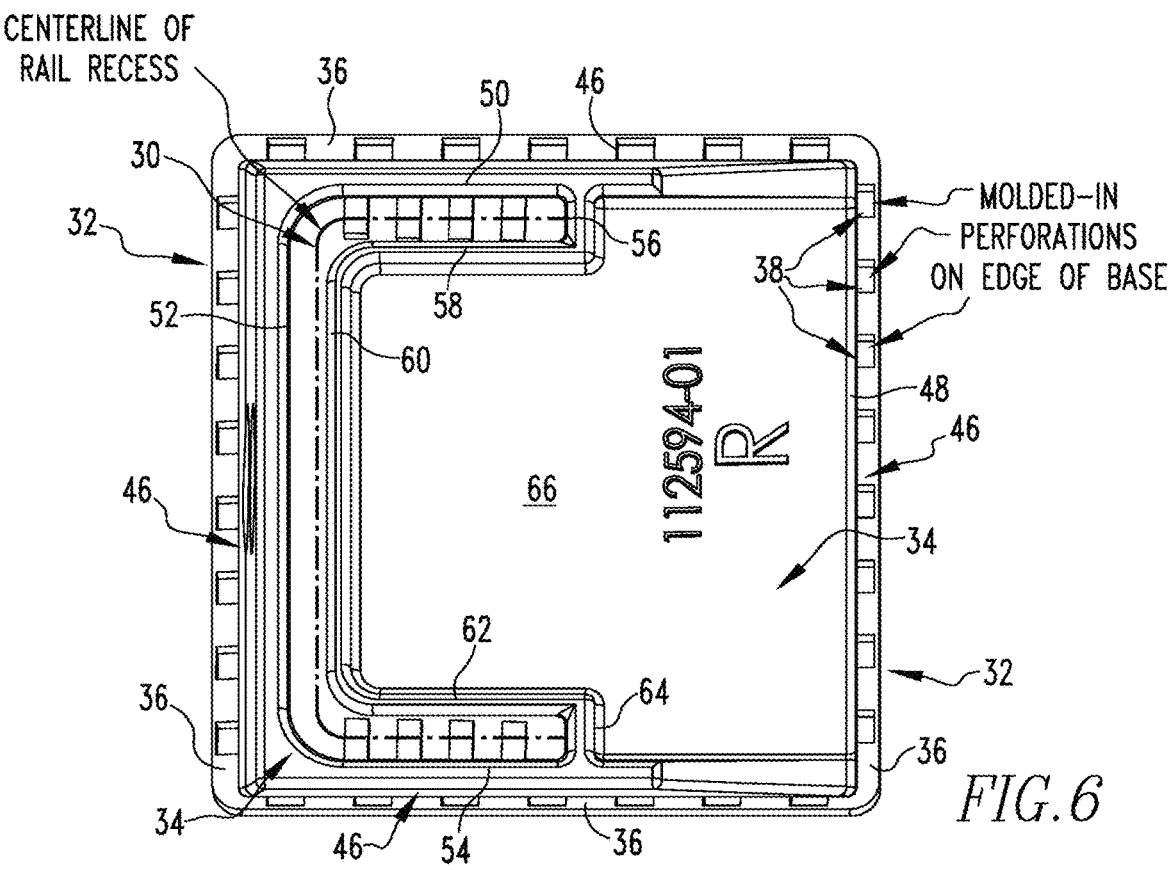
FIG. 6 shows a view looking directly down into the rail recess of the plastic body.

FIG. 6 shows a view looking directly down into the rail recess 30 of the plastic body 28. Notice here, and in previous figures, the existence of a series of perforations 38 around the periphery of the base 32. The perforations 38 are simply rectangular holes 21 which penetrate the flat base 32. These perforations 38 provide channels through which the rubber material may flow during the overmolding process. Thus, a secure mechanical bond is created between the rubber overmold material and the plastic body 28.

Figure 7:
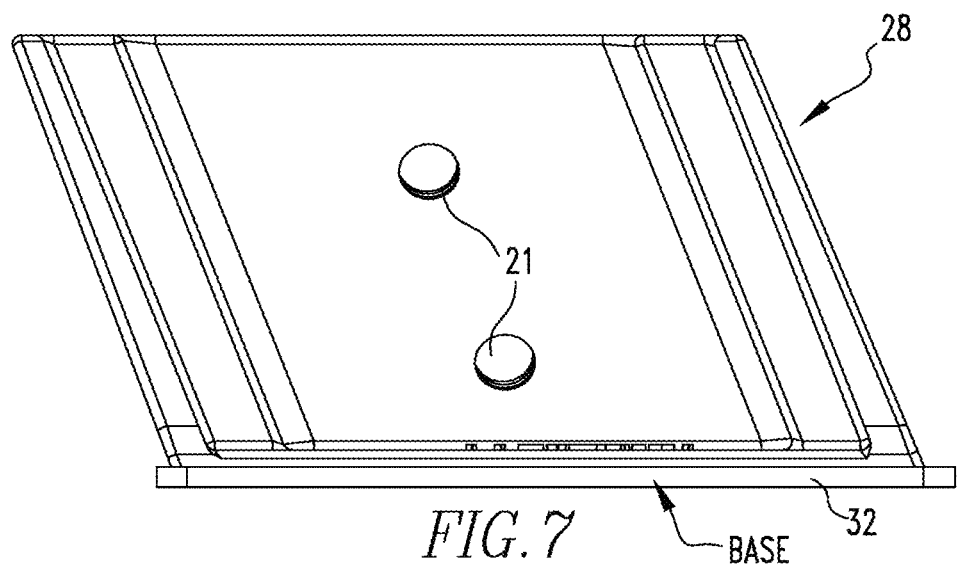
FIG. 7 shows a side view of the plastic body.
Figure 8:
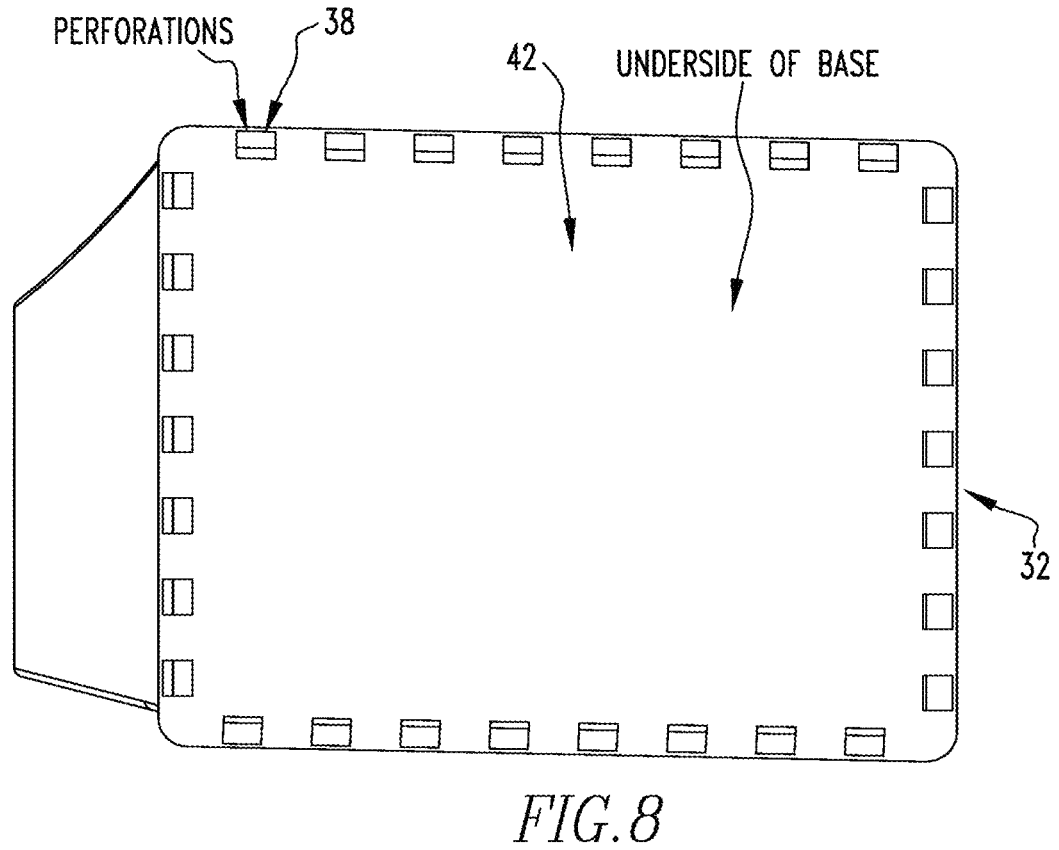
FIG. 8 shows a view of the bottom of the plastic body.
Figure 9:
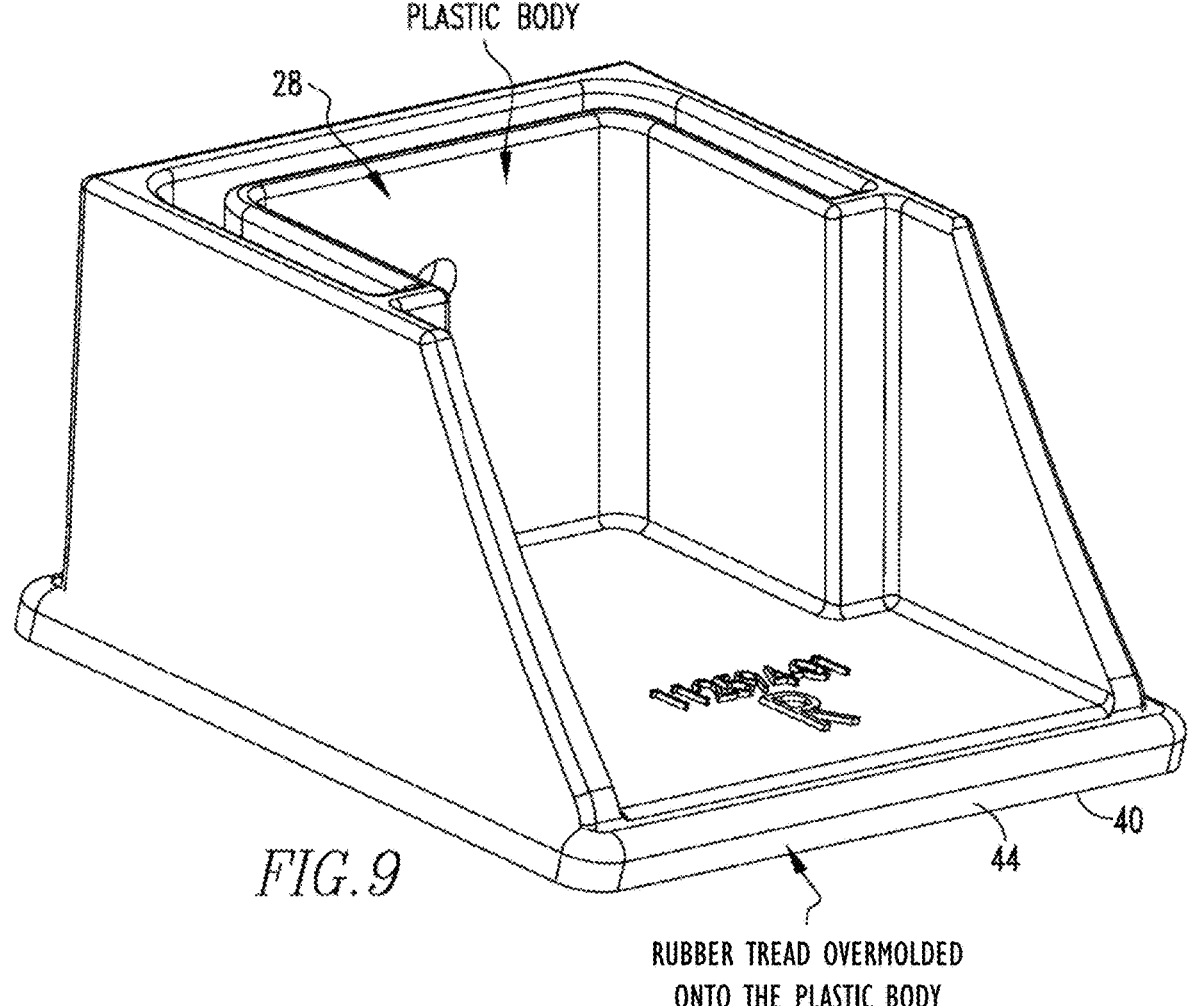
FIG. 9 is a perspective view of the complete overmolded foot.

FIG. 7 shows a side view of the plastic body 28 and FIG. 8 shows a view of the bottom 16 of the plastic body 28. Notice that the underside 42 of the base 32 is completely flat with no cavities or recesses.

FIG. 9 is a perspective view of the complete overmolded foot 26. Notice that the overmolded rubber extends a short distance up the sides of the plastic body 28. Thus, the entire edge 36 on the top side 34 of the base 32 of the plastic body 28 up to the perimeter 46 is buried within the overmold material.

The dimensions of the foot 26 are dependent to the dimensions of the first rail 12. Without the overmolded portion, the length of the base 32 is between 1.75 and 3 inches and preferably about 2.3 inches; the width of the base 32 is between 2 inches and 3.5 inches and preferably about 2.5 inches, and the thickness of the base 32 is between 0.07 and 0.2 inches, and preferably about 0.1 inch. The height of the body 28 is between 1.2 and 3 inches and preferably about 1.6 inches. The edge 36 is between 0.07 and 0.2 inches and preferably about 0.12 inches. Each perforation 38 is between 0.06 and 0.15 inches wide and preferably about 0.1 inch wide; and between 0.09 and 0.16 inches long and preferably about 0.13 inches. The tread 40 with the overmolded portion 44 can be between 0.5 and 1.5 inches thick and preferably about 0.8 inches thick. The distance of the overmolded portion 44 on the top side 34 from the perimeter 46 is preferably between 0.07 and 0.2 inches and preferably about 0.1 inches. The width of the recess 30 is slightly larger than the thickness of the rail that is inserted into the recess and may be between 0.1 and 0.3 inches and preferably about 1.5 inches. The length of the recess 30 between the second wall and the six wall, and the fourth wall and the eighth wall is slightly larger than the length of the first flange and second flange respectively, which may be between 0.75 and 2.5 inches and preferably about 1.5 inches; and the length of the recess between the third wall and the seventh wall is slightly larger than the length of the web, which may be between 2.5 inches and 4.5 inches and preferably about 3.1 inches. The rubber of the tread is preferably a standard PVC. The plastic of the body is preferably polypropylene.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder comprising:
   a first rail having a web, a first flange attached to a first end of the web and a second flange attached to a second end of the web;
   a second rail;
   rungs attached to the first rail and the second rail; and
   a foot comprising:
      a body with a recess shaped to receive bottom portions of the web, the first flange, and the second flange at a bottom of the first rail,
      a base having a top side from which the body extends and a bottom side opposing the top side, and at least four side edges, wherein the bottom side includes a first plurality of holes extending adjacent a first side edge of the at least four side edges, a second plurality of holes extending adjacent a second side edge of the at least four side edges, a third plurality of holes extending adjacent a third side edge of the at least four side edges, and a fourth plurality of holes extending adjacent a fourth side edge of the at least four side edges, wherein the first plurality of holes, the second plurality of holes, the third plurality of holes, and the fourth plurality of holes are different from one another, and
      a tread disposed along the bottom side of the base and extending into the first plurality of holes, the second plurality of holes, the third plurality of holes, and the fourth plurality of holes to form an overmolded portion of the tread that attaches the tread to the base, the tread forming a bond with the bottom side of the base and the first plurality of holes.

2. The ladder of claim 1, wherein the recess of the body has a continuous c-shape that conforms to a c-shape of the first rail created by the web, first flange, and second flange.

3. The ladder of claim 1, wherein the body includes a first c-shaped wall, and a second c-shaped wall and the recess is between the first c-shaped wall and the second c-shaped wall and has a c-shape defined by the first c-shaped wall and the second c-shaped wall.

4. The ladder of claim 3, wherein the first c-shaped wall is an outer wall and the second c-shaped wall is an inner wall, and the second c-shaped wall includes at least one hole for a fastener to attach the first rail to the foot.

5. The ladder of claim 4, wherein the first c-shaped wall includes at least one hole for a fastener to attach the first rail to the foot.

6. The ladder of claim 1, wherein a first thickness of the base at a perimeter of the base is the same as a second thickness of the base at a central portion of the base.

7. The ladder of claim 1, wherein the base is a plastic material and the tread is a rubber overmold material.

8. The ladder of claim 1, wherein the body and the base are a single integral component.

9. The ladder of claim 1, wherein the tread has a length extending along the bottom side of the base entirely from the first side edge of the base at the bottom side of the base to the second side edge of the base at the bottom side of the base, the first side edge opposing the second side edge.

10. A foot for a bottom of a first rail of a ladder comprising:

a body with a slot shaped to receive bottom portions of a web, a first flange, and a second flange at the bottom of the first rail;

a base having a top side from which the body extends, a bottom side opposing the top side, and at least four side edges, wherein the bottom side includes a first plurality of recesses extending adjacent a first side edge of the at least four side edges, a second plurality of recesses extending adjacent a second side edge of the at least four side edges, a third plurality of recesses extending adjacent a third side edge of the at least four side edges, and a fourth plurality of recesses extending adjacent a fourth side edge of the at least four side edges, wherein the first plurality of recesses, the second plurality of recesses, the third plurality of recesses, and the fourth plurality of recesses are different from one another; and a tread disposed along the bottom side of the base and extending into the first plurality of recesses, the second plurality of recesses, the third plurality of recesses, and the fourth plurality of recesses to form an overmolded portion of the tread that attaches the tread to the base, the tread forming a bond with the bottom side of the base and the first plurality of recesses, the second plurality of recesses, the third plurality of recesses, and the fourth plurality of recesses.

11. The ladder of claim 10, wherein the slot of the body has a continuous c-shape that conforms to a c-shape of the first rail created by the web, first flange, and second flange.

12. The ladder of claim 10, wherein the body includes a first c-shaped wall, and a second c-shaped wall and the slot is between the first c-shaped wall and the second c-shaped wall and has a c-shape defined by the first c-shaped wall and the second c-shaped wall.

13. The ladder of claim 12, wherein the first c-shaped wall is an outer wall and the second c-shaped wall is an inner wall, and the second c-shaped wall includes at least one hole for a fastener to attach the first rail to the foot.

14. The ladder of claim 13, wherein the first c-shaped wall includes at least one hole for a fastener to attach the first rail to the foot.

15. The ladder of claim 10, wherein a first thickness of the base at a perimeter of the base is the same as a second thickness of the base at a central portion of the base.

16. The ladder of claim 10, wherein the tread has a length extending along the bottom side of the base entirely from the first side edge of the at least four side edges of the base at the bottom side of the base to the second side edge of the at least four side edges of the base at the bottom side of the base, the second side edge opposing the first side edge.

17. The ladder of claim 10, wherein the base is a plastic material and the tread is a rubber overmold material.

18. The ladder of claim 10, wherein the body and the base are a single integral component.

19. A ladder comprising:

a first rail having a web, a first flange attached to a first end of the web and a second flange attached to a second end of the web;

a second rail;

rungs attached to the first rail and the second rail; and a foot comprising:

a body with a recess shaped to receive bottom portions of the web, the first flange, and the second flange at a bottom of the first rail, the body including a first outer wall and a second inner wall defining in part the recess and positioned to sandwich the web, the second inner wall having a width sized to extend substantially an entirety of a respective inner width of the web of the first rail, a base having a top side from which the body extends and a bottom side opposing the top side, and at least four side edges comprising a first side edge, a second side edge, a third side edge, and a fourth side edge, wherein the bottom side includes a plurality of holes spaced along a periphery of the base at each of the first side edge, the second side edge, the third side edge, and the fourth side edge, and a tread disposed along the bottom side of the base and extending into the plurality of holes to form an overmolded portion of the tread that attaches the tread to the base, the tread forming a bond with the bottom side of the base and the plurality of holes.

20. The ladder of claim 19, wherein the tread has a length extending along the bottom side of the base entirely from the first side edge of the base at the bottom side of the base to the second side edge of the base at the bottom side of the base, the first side edge opposing the second side edge.

* * * * *